Nov. 27, 1934.    M. M. TITTERINGTON    1,982,405
COMPENSATING DEVICE FOR MAGNETIC COMPASSES
Filed March 2, 1927    2 Sheets-Sheet 1

Inventor
Morris M. Titterington
By his Attorneys
Cooper, Kerr & Dunham

Nov. 27, 1934.   M. M. TITTERINGTON   1,982,405
COMPENSATING DEVICE FOR MAGNETIC COMPASSES
Filed March 2, 1927    2 Sheets-Sheet 2

INVENTOR
Morris M. Titterington
BY
Cooper, Kerr + Dunham
ATTORNEYS

Patented Nov. 27, 1934

1,982,405

UNITED STATES PATENT OFFICE 1,982,405

COMPENSATING DEVICE FOR MAGNETIC COMPASSES

Morris M. Titterington, New York, N. Y., assignor to Pioneer Instrument Company, Incorporated, Brooklyn, N. Y., a corporation of New York Application March 2, 1927, Serial No. 171,915

45 Claims. (Cl. 33—225)

This invention relates to devices for compensating magnetic compasses for semicircular deviation and heeling error.

Among the objects of my invention is to provide a compensating device adapted to be adjusted to compensate for semicircular deviation and which is characterized by simplicity in construction, facility in operation and the small amount of space required for housing and adjustment purposes.

It is a further object to provide means which possesses the various features characteristic of my compensating device and which is capable of use therewith for the purpose of compensating for the vertical component of a permanent magnetic field of a dirigible body or of associated masses so that the canting or pitching of an airplane, vehicle, vessel or other dirigible body carrying a magnetic compass will not cause semicircular deviation or affect the neutralization effects of the compensating device which has been adjusted to compensate for semicircular deviation under conditions when the dirigible body is substantially horizontal.

The usual type of compensating device is designed for neutralizing the horizontal component of permanent magnetic fields and, in general, a magnet (or number of magnets) is placed in respect to the magnetic compass so as to create a magnetic field of the same strength and of a polarity opposite to that of the resultant of the horizontal components of all of the permanently magnetized masses. This condition produces a neutral effect upon a magnetic compass and eliminates all semicircular deviation due to horizontal components of permanently magnetized masses. Various expedients have been resorted to to effect this condition and, usually, comprise provisions for varying the positions of small permanent magnets in respect to a magnetic compass and/or of varying the number of magnets. In contradistinction to any method employing these expedients, my invention embodies an adjustment of the effective fields of a small magnet without necessitating moving the magnet toward or away from the compass card.

A simple form of my invention includes the use of two axially alined permanent bar magnets with like poles in an abutting or close relation, or better still a single bar magnet having consequent poles. This bar magnet is disposed horizontally and has a magnetic screen or shield. The magnetic screen comprises a member of any suitable magnetic material of high permeability, as for example, permalloy and may be in the form of a soft iron sleeve. The external strengths of the two magnetic fields of the bar magnet are variable in accordance with the relative position of the magnetic screen along the bar magnet and the desired neutralization of the horizontal component of magnetism of the masses is obtained by adjusting the resultant external magnetic field or the effective field of magnetism of the external fields of the bar magnet and, when only one bar magnet is used, by properly placing the bar magnet in respect to the compass. The horizontal component of magnetism of the masses may be compensated by two bar magnets placed at right angles to each other so that the resultant counteracting effect of the two bar magnets would be equivalent to the effect produced by a single bar magnet placed in line with the horizontal component of magnetism of the masses.

For compensating for the vertical component of the permanent magnetism of the masses I utilize a bar magnet and an associated magnetic screen in a vertical position below the center of the magnetic compass.

All of the compensating magnets used are enclosed within a housing or shell and where they are assembled so as to be maintained in fixed positions within the shell, the amount of enclosed space may be of minimum volume. Other objects attained by my invention will be pointed out hereinafter in the specification and are disclosed in the drawings, in which.

Figure 1:
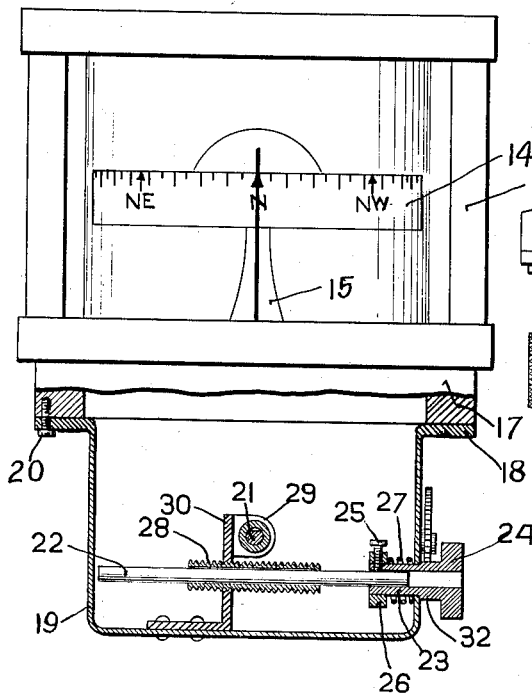
Fig. 1 is an elevation of a compass bowl and of a compensating device, shown in section, in which two horizontal bar magnets are used.
Figure 2:
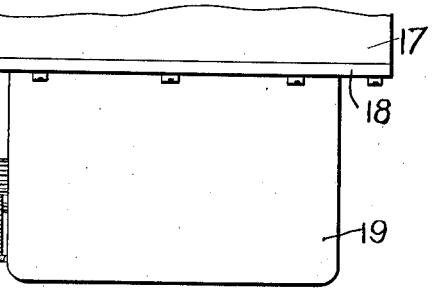
Fig. 2 is a view of the housing or shell of the compensating device as seen from the left of Fig. 1.

For the purpose of assisting in understanding the subject matter of my invention I have illustrated a compass card 14 which is pivotally mounted upon a post 15 within a bowl 16. Extending from the lower portion of bowl 16 there is a ring 17 to which is secured the laterally extending flange 18 of a housing 19. The flange of the housing is held in place against the lower surface of the ring by a plurality of fastening means such as screws 20.

Figure 7:
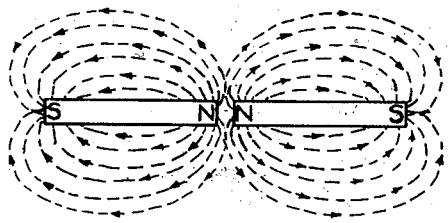
Figs. 7, 8, 9 and 10 are details whereby the principles of my invention may be understood.
Figure 8:
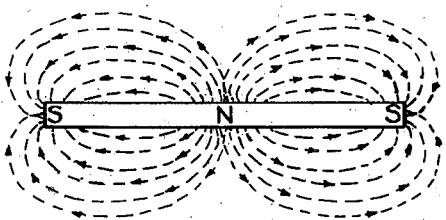

The size of the housing is dependent upon the number of fixed parts of the compensating device. In the present disclosure, these fixed parts comprise consequent pole magnets and in each of Figs. 1 and 6, two of such magnets are illustrated; in Fig. 4, three of such magnets are illustrated; and in Fig. 5, one of such magnets is illustrated. Each one of these magnets comprises a single bar magnet similar to the one illustrated in Fig. 8, yet two ordinary bar magnets having like poles adjacent each other could be used if desired, Fig. 7. The two magnetic fields of two ordinary magnets, Fig. 7, or of a consequent pole magnet, Fig. 8, comprise a pair of opposed magnetic fields, the two fields being of substantially the same strength when not affected or shielded by outside influence. When a consequent pole magnet is placed alongside and parallel to a magnetic compass the natural direction of the magnetic compass will not be affected, but an alteration in the angular relation of the consequent pole magnet and a variation in the external field of magnetism of either one or both of the two fields of magnetism will cause a deviation of the magnetic compass.

Figure 9:
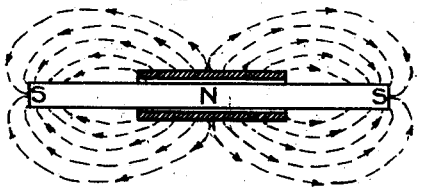
Figure 10:
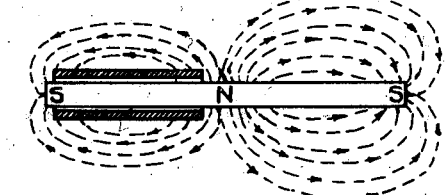

I utilize these phenomena of consequent pole magnets in my compensating device by using a magnetic screen or shield of some suitable magnetic material having a high permeability, as for example, soft iron or permalloy for the purpose of unbalancing the co-axial magnetic fields. The effect of an iron sleeve as a magnetic screen is diagrammatically illustrated in Figs. 9 and 10, and it is apparent that as the sleeve is moved towards one end of the magnet, the external magnetic field at that end is considerably reduced because of the greater conductivity of the material (iron) immediately surrounding this end in respect to the conductivity of the material (air) surrounding the opposite end. Hence, with the sleeve displaced, the balance of the external fields (Fig. 9) is destroyed and a resultant external magnetic field is produced which has a direction dependent upon the position of the sleeve. Thus, the strength of the external magnetic field resulting from the two magnetic fields of a consequent pole magnet may be varied from nil to maximum in one direction and through nil to maximum in the other direction without a change in the position of the magnet. Of course this is true whichever the bar or the shield is displaced since the results obtained are dependent upon relative position. The direction of the external magnetic field resulting from the partly shunted magnetic fields of a consequent pole magnet also may be varied by changing the angular position of the magnet.

The strength of the resultant external magnetic field is dependent upon the relation of the bar magnet in respect to the magnetic screen and it is evident that if the resultant external magnetic field thereby produced is opposite in direction and equal in strength to any given magnetic field, the opposed magnetic fields neutralize each other.

In my compensating device I mount the magnets in a housing or shell and, in Fig. 1, two horizontally disposed consequent pole magnets are shown, magnet 21 and magnet 22 at right angles to magnet 21. One end of each of these magnets is supported in a bushing 23 whose outer end 24 is a knurled knob for facilitating rotation thereof. A set screw 25 passes through a collar 26 and through the inner end of the bushing and serves to hold the magnet in fixed relation with the bushing. A helical spring 27 intermediate the collar 26 and the inner wall of housing 19 maintains the magnet in a normal axial position.

The shield for each magnet comprises an iron sleeve 28 which is keyed or otherwise related to its associated magnet so as to maintain the sleeve and magnet in a fixed rotary relation while permitting relative axial movement. Each sleeve 28 is externally threaded and engages with an immovable nut 29 mounted upon a standard 30 which is secured to the housing 19.

Figure 3:
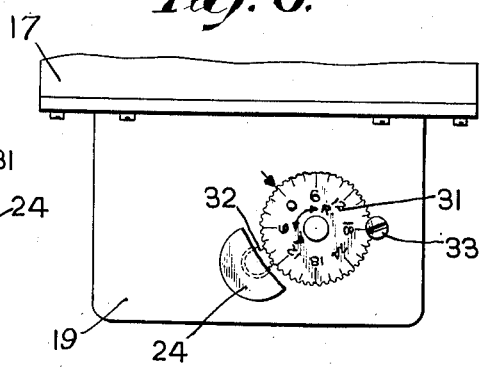
Fig. 3 is a view of the housing or shell of the compensating device as seen from the right of Fig. 1.

It may be preferable to have indicating means for indicating the degree of unbalance of the two magnetic fields of a consequent pole magnet and for this purpose I provide a rotatively mounted dial 31 which has teeth normally engaging with a pinion 32 associated with each bushing 23. In adjusting the dial to correspond with the balanced condition of one consequent pole magnet, the bushing 23 is pulled outwardly and against the exertion of spring 27 until the pinion 32 is disengaged from the dial. The dial then may be turned alone and the zero reading thereof positioned opposite the index, Fig. 3. After reengagement of the pinion and the dial any axial displacement of the sleeve will be indicated upon the dial. A locking screw 33 will permit the dial and hence the sleeve to be locked in any desired or set position.

Figure 4:
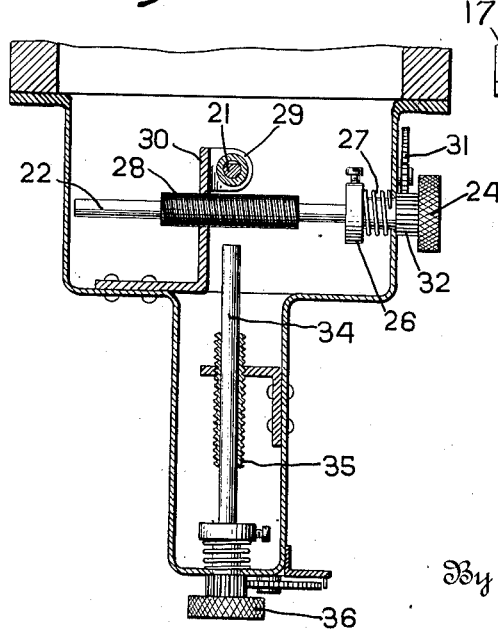
Fig. 4 illustrates the housing of the compensating device enlarged to accommodate a vertical bar magnet.

Fig. 4 shows a compensating device for neutralizing the vertical component as well as the horizontal component of a magnetized mass. A consequent pole magnet 34 is placed with its axis centrally of the compass card and its associated parts are similar to the ones previously described as being associated with magnets 21 and 22 respectively. Sleeve 35 is raised or lowered in accordance with the direction of rotation of knob 36. The housing need not be enlarged any more than is necessary to protect the magnet.

Figure 5:
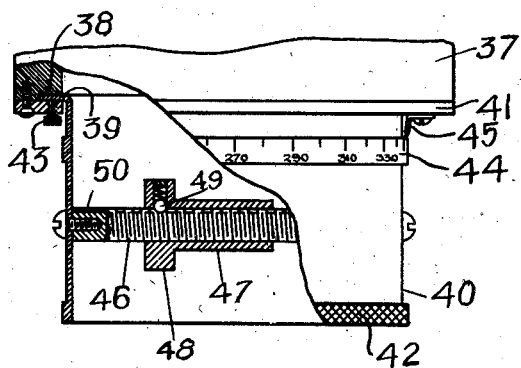
Fig. 5 illustrates a compensating device having one consequent pole magnet mounted in a rotatable housing.
Figure 6:
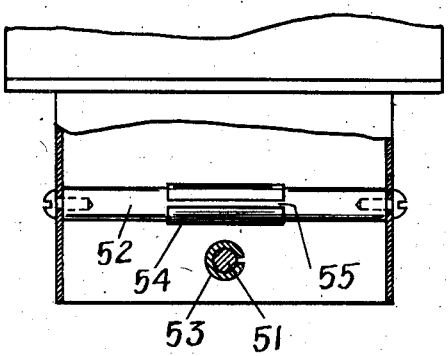
Fig. 6 illustrates a simple form of compensating device similar to that shown in Fig. 5 but having two consequent pole magnets.

In Figs. 5 and 6 I have illustrated two structures which embody simplified applications of my invention. In the device of Fig. 5, there extends from the lower portion of the compass bowl a ring 37 which has an annular recess 38 for accommodating a laterally extending flange 39 of a housing or shell 40. The flange of the shell is held in place by a circular retaining plate 41 which is secured to ring 37. This construction illustrates one manner of mounting the shell while at the same time permitting for rotary displacement thereof in respect to its standard, the standard in the present case being the compass bowl. A clearly defined and knurled ring 42 on the shell comprises means whereby the shell may be manipulated for positioning the magnetic fields of the magnet in divers positions relative to the compass bowl. A screw 43 is provided for holding the shell in any desired position. An azimuth circle 44 is mounted outside of the shell and an index 45 defines the lubber's line from which any rotary displacement of shell 40 may be noted by observing the reading of the azimuth circle opposite the index. In Fig. 5, but one consequent pole magnet 46 is utilized and it is held in place within the rotatable shell 40 by means of screws or like fasteners. It is threaded along its length and a sleeve 47 comprising its magnetic screen engages therewith. This sleeve has a knurled collar 48 to facilitate handling and, for making sure that the sleeve will remain in an adjusted position, I propose the use of a spring pressed ball 49 carried by the sleeve and adapted to engage a groove 50. Where one groove is used, one definite adjusting position per revolution of the sleeve is assured.

In Fig. 6 two consequent pole magnets 51, 52 are illustrated and, for simplicity, they may be of a circular cross-section with plain or unfinished exteriors. The magnetic screens comprise shields 53, 54 each having a longitudinal separation 55 whereby the longitudinal edges may be pressed toward each other in order to cause the sleeve to tightly engage the respective magnet when the adjusted position of the shield is determined.

Operation

In compensating the semicircular deviation of a magnetic compass mounted on a dirigible body such as an airplane, the airplane would be swung on the ground so that it was headed in a known direction, preferably one of the cardinal points, such as north. The compass should be oriented in respect to the airplane. One manner of doing this consists of positioning the lubber's line of the compass in correct relation with the fore and aft line of the airplane. Referring to Fig. 1, with the airplane headed north, magnet 21 would have its axis N—S and magnet 22 would have its axis E—W. Magnet 21, having its axis N—S, could not exert any influence tending to rotate the compass card 14 even though the magnet might not be exactly neutral, that is, even though the iron sleeve were not exactly in the center. If under these conditions the compass card would show a deviation, say of 4°, the adjusting knob on the E—W magnet would be rotated until the reading of the compass card were zero. This, of course, is what the compass card should indicate when the airplane heads north. The airplane then would be swung onto an E—W heading. With the airplane heading east and the compass card indicating 92° instead of 90° it is evident that further adjustment is necessary. The magnet 21, which previously was N—S, is now E—W and the adjusting knob of this magnet is then rotated until the compass card indicates 90°. The compass now is compensated for all headings in a horizontal plane the resultant of the magnetic fields of magnets 21 and 22 serving to neutralize the horizontal component of the permanently magnetized masses related to the airplane. If the magnetic masses of the airplane exert a force only in a horizontal plane, or if compensation for semicircular deviation when the airplane is horizontal is all that is required, then no other adjustments are necessary. The adjusted positions of the respective sleeves would be assured by tightening the locking screw 33 or resorting to other locking devices which would prevent anybody from accidentally or otherwise upsetting the settings attained. In a device similar to the one illustrated in Fig. 6 the shields would be pinched tightly about the respective magnets.

It may be that the magnetic masses on the airplane exert a force at an angle to the horizontal and, for compensating the vertical component of this force further adjustments are necessary. The adjustments necessary may be made by tilting the airplane, observing the deviation of the compass card due to the component of the magnetic field perpendicular to magnets 21 and 22 now being at an angle to the horizontal and thereby introducing an error in the reading of the horizontally disposed compass card, and then rotating the adjusting knob 36 (Fig. 4) of the magnet 34 until the deviation reading of the card is eliminated. By this method of adjustment, the magnetic force of any magnetic mass may be neutralized by neutralizing its horizontal and vertical components.

When only one magnet is employed, as shown in Fig. 5, the airplane is turned onto different headings and the errors of the compass reading at the various headings are noted. A graph in which the errors are plotted against the headings of the airplane will indicate that a magnetic field of a certain strength and placed in a certain angular position would reduce the errors to zero on all headings. The magnet is then rotated so that it is in the correct angular relation to the airplane and the strength of its resultant external magnetic field is adjusted by positioning the sleeve so as to bring the compass card onto the correct reading. The compass would then be correct on all headings of the airplane when horizontal. If it is desired to have the particular compass compensated for semicircular deviation due to vertical components of magnetic masses, it would be necessary to utilize a vertically disposed magnet in the manner already described.

My invention is capable of a wide variation and relationship of parts without departure from the nature and principle thereof and I do not restrict myself unessentially in the foregoing or other particulars, but contemplate such alterations and modifications within the scope of the appended claims as may be found to be advisable.

I claim:

1. An apparatus for compensating semicircular deviation of a magnetic compass comprising, a magnetic compass, a bar magnet having consequent poles, said magnet being disposed with its magnetic fields within influencing distance of said compass, and means for varying the strength of the external magnetic field of said bar magnet.

2. An apparatus for compensating the semicircular deviation of a magnetic compass comprising, a magnetic compass, means having a pair of magnetic fields of substantially equal strength, one field being opposed to the other, said means being disposed within magnetic influencing distance of said compass, and means for varying the strength and direction of the external field resulting from both of said magnetic fields while said first-mentioned means remains fixed.

3. An apparatus for compensating semicircular deviation of a magnetic compass comprising, a magnetic compass, a bar magnet having consequent poles, a second bar magnet having consequent poles and placed substantially at right angles to said bar magnet, and means for varying the strength of the external fields of said bar magnets whereby magnetic influence causing semicircular deviation of said compass in planes parallel to both of said bar magnets may be eliminated.

4. An apparatus for compensating semicircular deviation of a magnetically controlled direction indicator comprising, a compass bowl, a magnetic compass, means having two co-axial and opposed magnetic fields, said means being disposed within magnetic influencing distance of said compass, a magnetic screen movable through said magnetic fields, and means for adjustably positioning said first named means in divers positions relative to said compass bowl.

5. An apparatus for compensating semicircular deviation of a magnetically controlled direction indicator comprising, a compass bowl, a magnetic compass, a bar magnet having consequent poles, said magnet being disposed with its magnetic fields within influencing distance of said compass, magnetic shielding means variably positionable along said bar magnet, and a housing for said bar magnet, said housing being mounted for rotation in respect to said compass bowl about an axis perpendicular to the axis of the bar magnet.

6. An apparatus for compensating semicircular deviation of a magnetic compass comprising, a compass, a plurality of pairs of magnets disposed within influencing distance of said compass, the magnetic fields of each pair of magnets being opposed and one of the pairs of magnets being disposed perpendicular to the remaining magnets, and shielding means for the magnetic fields of each pair of magnets.

7. An apparatus for compensating semicircular deviation of a magnetically controlled direction indicator comprising, a compass, a compass bowl, a plurality of consequent pole magnets at right angles to each other, said magnets being disposed within magnetic influencing distance of said compass, shielding means comprising a magnetic screen on each magnet, and means for maintaining each screen at an adjusted position on its associated magnet.

8. An apparatus for compensating semicircular deviation of a magnetically controlled direction indicator comprising, a compass, a compass bowl, a housing associated with said compass bowl, a plurality of consequent pole magnets, said magnets being arranged within said housing at right angles to each other and within magnetic influencing distance of said compass, a sleeve associated with each of said magnets, a fixed nut for each of said sleeves, means for rotating said sleeves and advancing them along said magnets, and indicating means for indicating the displacement of each sleeve relative to its associated magnet.

9. An apparatus for compensating semicircular deviation of a magnetic compass comprising the combination with a magnetic compass, of means having a pair of magnetic fields, means having another pair of magnetic fields, each of said means being disposed within magnetic influencing distance of the compass, like poles of each pair of said magnetic fields being adjacent each other and the remaining poles of each pair of said magnetic fields extending away from each other, and a magnetic screen for each of said pairs of magnetic fields.

10. An apparatus for compensating semicircular deviation of a magnetic compass comprising the combination with a magnetic compass, of means having a pair of magnetic fields, means having another pair of magnetic fields disposed transversely to said first named pair of magnetic fields, the magnetic fields comprising each of the pairs of said pairs of magnetic fields being opposed to one another and within influencing distance of the compass, and shielding means comprising magnetic screens for said magnetic fields.

11. An apparatus for neutralizing the magnetic influence of a given magnetic field comprising, in combination, a magnet having consequent poles, and a sleeve disposed upon said magnet, said sleeve having a magnetic permeability greater than unity.

12. An apparatus for compensating semicircular deviation of a magnetic compass comprising, in combination, a bar magnet having consequent poles, a magnetic shield disposed about said bar magnet so as to influence the magnetic fields due to the magnet, the magnetic permeability of said shield being greater than unity, and means to support said magnet.

13. In combination, a consequent pole magnet, shielding means for shunting the magnetic fields of said magnet, and means for shifting the position of said shielding means bodily along the axis of the magnet to variously affect the magnetic fields of said magnet whereby the magnetic influence resulting from both of the magnetic fields of the magnet may be varied.

14. The combination with a compass, of means for compensating semicircular deviation of said compass, said means comprising a consequent pole magnet, shielding means for shunting the magnetic fields of said magnet, and supporting means for said magnet and shielding means, said supporting means being rotatable about the axis of said compass.

15. The combination with a compass, of means for compensating semicircular deviation of said compass, said means comprising a consequent pole magnet, shielding means for shunting the magnetic fields of said magnet, supporting means for said magnet and shielding means, and means whereby the direction of the axis of the magnet may be changed to produce a desired resultant magnetic influence in a desired direction in respect to said compass.

16. The combination with a magnetic compass, of compensating means therefor including a magnet and an adjustable highly permeable screen for adjusting the compensating effect of the magnet on the compass.

17. The combination with a magnetic compass, of compensating means therefor including a bar magnet, a highly permeable screen for the magnet, and means for adjusting the screen along the magnet to adjust the compensating effect thereof on the compass.

18. The combination with a compass responsive to the earth's magnetic field, of a compensator therefor including a plurality of magnets and an adjustable highly permeable screen for adjusting the compensating effect of said magnets on the compass.

19. The combination with a compass for indicating the direction of the terrestrial magnetic field, of compensating means including a plurality of magnets, highly permeable screening means for said magnets, and means for adjusting said screening means relative to said magnets to vary the compensating effect thereof on the compass.

20. The combination with a compass adapted to indicate the direction of the earth's magnetic field, of a compensator for said compass including a plurality of bar magnets, highly permeable screening means for said magnets, and means for adjusting the screening means relative to said magnets to vary the compensating effect of the latter on the compass.

21. The combination with a compass for indicating the direction of the terrestrial magnetic field, of compensating means including a plurality of consequent-pole magnets, highly permeable screening means for said magnets, and means for adjusting said screening means relative to said magnets to vary the compensating effect of the latter on the compass.

22. The combination with a compass for indicating the direction of the terrestrial magnetic field, of compensating means including a pair of consequent-pole magnets arranged at right angles to each other, and highly permeable adjustable screening means for adjusting the compensating effect of said magnets on the compass.

23. The combination with a compass for indicating the direction of the terrestrial magnetic field, of compensating means including a pair of consequent-pole magnets arranged at right angles to each other in parallel planes, and highly permeable adjustable screening means for adjusting the compensating effect of said magnets on the compass.

24. A method of neutralizing a given field of magnetism which consists in producing two coaxial and opposed magnetic fields in the vicinity of the field to be neutralized, and varying the magnitude of each of said fields until the resultant field substantially balances the field to be neutralized.

25. The combination with a compass responsive to the earth's magnetic field, of a compensator therefor including a magnet and an adjustable highly permeable screen for adjusting the compensating effect of the magnet.

26. In a device for adjusting the magnetic field of the compass, the combination with the compass of two sets of coupled magnets, one set acting at the compass at right angles to the other, an armature controlling the degree of action of one set, a second armature controlling the degree of action of the other set and means for adjusting the relative positions of the magnets and armatures of each set.

27. A device for adjusting the magnetic field at a compass, the combination with the compass of means comprising two relatively perpendicular sets of magnetic adjusters, each set comprising two members of which one includes stationary reversely directed magnets in the same plane or parallel plane as the magnets of the other set and an armature between the magnets in combination with means for adjusting the relative positions of the members of each set.

28. An apparatus for neutralizing the influence of a given magnetic field, comprising a bar magnet, and a sleeve of magnetic material disposed about said magnet and adapted to be positioned along the length thereof.

29. The combination with a magnetic compass, of compensating means therefor including a magnet and an adjustable sleeve of magnetic material disposed about said magnet for adjusting the compensating effect of the latter on the compass.

30. The combination with a magnetic compass, of compensating means therefor including a bar magnet, a highly permeable screen for said magnet and formed as a sleeve disposed about the latter, and means for adjusting the relative position between the sleeve and the magnet to adjust the compensating effect of the latter on the compass.

31. The combination with a compass responsive to the earth's magnetic field, of a compensator therefor including a plurality of magnets and a plurality of adjustable sleeves of magnetic material for said magnets for adjusting the compensating effect of said magnets on the compass.

32. The combination with a compass responsive to the earth's magnetic field, of a compensator therefor including a plurality of pairs of bar magnets, said pair being perpendicular to each other, adjustable sleeves of magnetic material disposed about said magnets, and means for adjusting the relative positions between said sleeves and magnets to adjust the compensating effect of the latter on the compass.

33. In using a magnetic circuit and cooperating armatures to modify a magnetic field at a compass, the novelty which consists in setting up the circuit and armatures near the compass, in adjusting the position of one armature to modify the magnetic effect of the circuit in one direction at the compass and in subsequently varying the position of a second armature to modify the magnetic effect at the compass in a direction at right angles to that of the first modifying adjustment.

34. A device for adjusting the magnetic field at a compass comprising two pairs of stationary reversely directed magnets in the same or parallel planes and an adjustable armature between and adjustable along the magnets of each pair.

35. In a device for adjusting the magnetic field at a compass, two pairs of bar magnets placed symmetrically with respect to an intermediate axis and a magnetic by-pass between and adjustable along the magnets of each pair.

36. In using an armature member and a cooperating magnetic circuit member to modify a magnetic field at a compass, the process which consists in setting up the members in the neighborhood of the compass and in adjusting the bodily position of one of the members with respect to that of the other in order to modify the field at the compass.

37. In a device for adjusting a magnetic field at a compass, magnet poles balanced with respect to their effect upon the compass, an armature movable with respect to the poles to unbalance the poles with respect to said compass and means for moving the armature.

38. In the art of balancing a magnetic field by magnetic poles at a compass, the process which consists in setting up a balanced magnetic field in proximity to the compass and in reversely affecting the magnetic poles of the balanced field by varying the path of the return flux of the poles.

39. In the art of balancing a magnetic field formed by magnets at a compass, the process which consists in balancing the magnets in proximity to the compass and in varying the relative strengths of the magnets balanced to unbalance them while maintaining the magnets in stationary position.

40. In the art of balancing a magnetic field by magnets and an armature at a compass, the process which consists in forming a balanced system of magnet poles and armature return-circuit therefor and in alternating the balance of the poles by moving the armature.

41. An apparatus for compensating semi-circular deviation of a magnetic compass, comprising the combination with a magnetic compass, of two pairs of bar magnets placed symmetrically in approximately the same planes, one pair with the other and with their fields at right angles to each other and magnetic means moving approximately within the planes of the bar magnets and overlapping them for variantly reducing or rendering more available the external magnetic flux of said magnets, whereby the external fields of said magnets affecting the compass are reduced or increased.

42. An apparatus for compensating semi-circular deviation of a magnetic compass, comprising the combination with a magnetic compass, of one set of magnets on opposite sides of the axis of the compass at substantially the same height, cooperating to adjust the compass needle in either direction in one compass position, a second set of magnets on opposite sides of the axis of the compass at substantially the same height as the first magnets arranged at a 90° position with respect to the first set and cooperating to adjust the compass needle in either direction at a compass position horizontally perpendicular to the first position and magnetic material movable along the magnets in the respective sets to reduce or increase the free external magnetic field of the magnets in the sets, whereby the direction and extent of magnetic adjustments are varied.

43. In a compass, compensating means including a pair of consequent pole magnets and means for varying the effective fields of said magnets.

44. In combination with a compass, compensating means therefor including a pair of magnets mounted adjacent said compass, said magnets having their magnetic axes in substantial alignment and with a pole of one of said magnets adjacent a pole of like polarity of the other of said magnets, and means for varying the compensating effect of said magnets on the compass.

45. In a compass, a pair of compensating magnets having their magnetic axes in substantial alignment and a pole of one of said magnets adjacent a pole of like polarity of the other of said magnets, magnetic means in substantially the same plane with the magnetic axes of said magnets, said magnetic means and said magnets being relatively movable along the magnetic axes of said magnets for increasing or decreasing the compensating effect of said magnets on the compass, and means for producing relative movement between said magnetic means and said magnets along the magnetic axes of the latter.

MORRIS M. TITTERINGTON.